Oct. 7, 1930.  W. C. MacGREGOR  1,777,318
AUTOMOBILE CEMENT MIXER
Filed April 14, 1927

Inventor
Wallace C. MacGregor
By Kent W. Worrell
atty.

Patented Oct. 7, 1930

1,777,318

UNITED STATES PATENT OFFICE

WALLACE C. MacGREGOR, OF HARVEY, ILLINOIS

AUTOMOBILE CEMENT MIXER

Application filed April 14, 1927. Serial No. 183,720.

This invention relates to a mechanical mixer of the rotary type which is designed to be easily and quickly applied to the wheel of an ordinary automobile truck or pleasure car for mixing the ingredients commonly employed in producing mortar, concrete, stucco and cement mixtures of different kinds for use in the construction of buildings, floors, walls and other improvements of a structural nature. The principal object of the invention is to provide a simple, inexpensive and efficient mixer which can be quickly and easily applied to a driving wheel of an ordinary automobile, and which when so applied is instantly available for use in mixing any desired cementitious ingredients, the power being derived from the engine of the automobile by raising one of the driving wheels and blocking the other against rotation.

Other objects of the invention are to provide adjustable means for connecting such a mixer to an automobile wheel or rim; to utilize the tire or rim holding bolts for attaching the mixer; and in general to produce the construction herein shown and described.

In the accompanying drawing.

Figure 1:
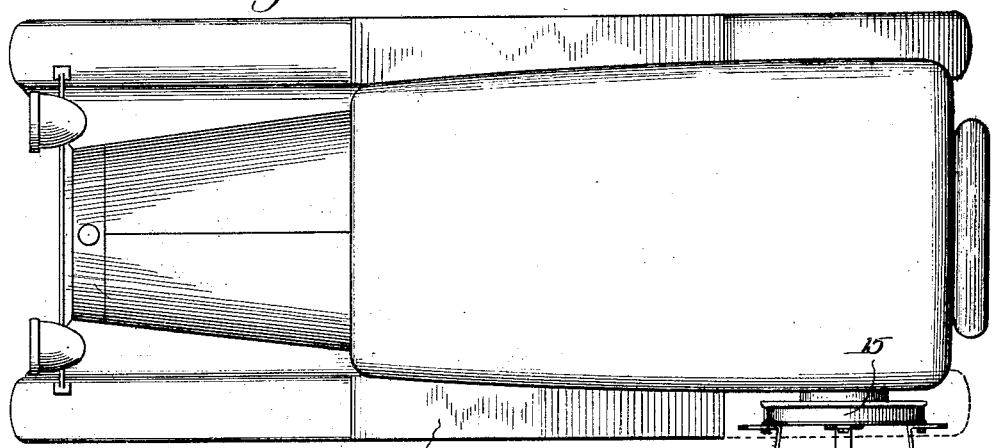
Figure 1 is a plan view illustrating an automobile with a mixer constructed in accordance with the principles of this invention applied to one of the driving wheels thereof.

In mixing small quantities of concrete and other cementitious materials, particularly for small jobs and repair work, it is the custom to blend the ingredients by hand, that is, with the aid of a shovel or a hoe, and the resultant mixture is usually of an inferior quality, due to the improper mixing.

In certain public improvements, there are official requirements or specifications that demand a machine mixture of concrete, some specifications even requiring that each batch of concrete shall be mixed thoroughly for at least one minute. It is obvious, therefore, that a high grade concrete is produced when a mechanical mixing device is used, and although the present device is not intended to be efficient in the production of building mixtures on a large scale, it is primarily designed to be of service to the small contractor, home owner, farmer and repair man, in the mechanical mixing of small quantities of ingredients, eliminating a large part of the manual labor that would ordinarily be connected therewith.

Referring more particularly to the accompanying drawings, a mixer container 11 is preferably in the form of a small barrel, either strongly constructed of wooden staves, or metal, having a head open at one end, the other end or bottom being closed. To this barrel is attached on the inside, mixing members or flights 12, each comprising a metal plate bent substantially at right angles and attached on the interior of the barrel, preferably at an inclination that it will confine the material mixed within the barrel.

In order to attach the mixing container or barrel 11 to the driving wheel of an automobile, a plurality of slotted brackets 13 are attached to the closed end of the barrel, projecting from the end thereof and with the slotted portions parallel with the end of the barrel so that slots 14 thereof may be engaged by bolts 15 ordinarily placed in the rim 16 of an automobile wheel for attaching a removable tire and rim thereto, the brackets 13 being held in place by ends 17 at the ends of the bolts 15.

With this construction it is obvious that the tire and its rim must first be removed from the wheel 16, but this is a simple matter, merely requiring that the driving wheel of an automobile 18 be raised and held in elevated position, the tire removed and the mixing barrel applied thereto, using the same bolts by means of which the tire and its rim are normally held in place. It is obvious that in order to drive one of the rear wheels of an automobile, for mixing purposes, the other or opposite driving wheel must be locked or blocked against rotation because of the connecting differential gear.

Figure 2:
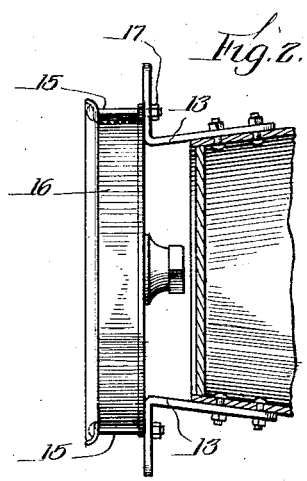
Figure 2 is a sectional view showing a method of connecting the mixer to the wheel.
Figure 3:
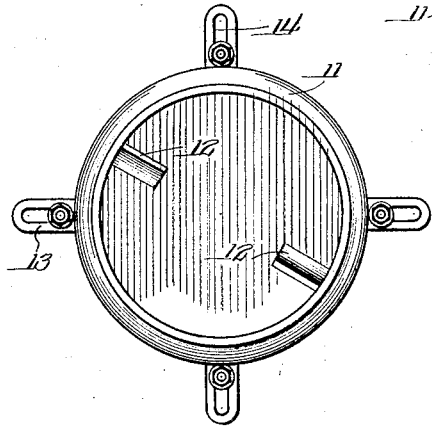
Figure 3 is an elevation of the mixer.
Figure 4:
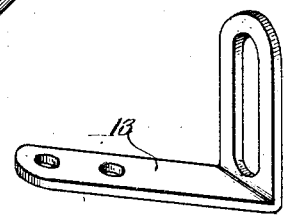
Figure 4 is a perspective of a fastening bracket.
Figure 5:
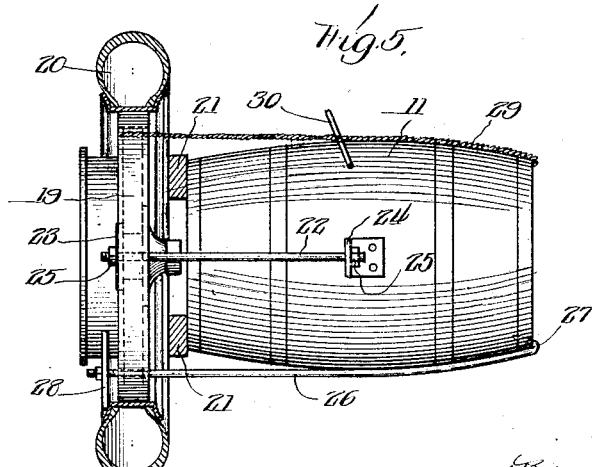
Figure 5 illustrates a modified method of adjustment without removing the tire from the wheel.

It is also possible to provide a construction for holding the mixing barrel 11 in connection with an automobile wheel 19 without removing its tire 20 therefrom, as shown more particularly by Figure 5. In this case it is necessary to provide cross pieces 21 engaging the side faces of the tire 20 and upon which the base of the barrel 11 rests. Instead of attaching the mixer barrel 11 to the rim of the wheel, as shown in Figure 2, a rod 22 is provided which extends between the spokes of the wheel at one end and through a plate 23 engaging the spokes on the side opposite the barrel, the other end extending through a bracket 24 attached to the barrel 11, the ends of the rod 22 being provided with nuts 25 threaded upon the rod. An additional fastening member consists of a longer rod 26 having a hook 27 at its outer end to engage the open end of the barrel and extending between the spokes and through a plate 28 at the rear side of the wheel, the ends of the plate preferably engaging the wheel rim rather than the spokes. Another form of fastening consists of two or more wire strands 29 attached at the outer end of the barrel, looped around one or more of the spokes and having a twisting bar 30 by means of which the strands may be tightened, the bar engaging the barrel 11 to prevent the strands from untwisting.

With the constructions above described, it is obvious that a mixing barrel of this kind may be quickly and easily applied to the driving wheel of an automobile, either with the tire in place on the wheel or by removing the tire and attaching it to the rim, and that when so applied, the mixer is easily operated by the driving engine of the automobile by simply elevating the wheel to which the barrel is applied so that it runs free from engagement with the ground and by blocking the opposite wheel against rotation. The ingredients to be mixed are shoveled or otherwise deposited into the mixing barrel in the desired proportions, and when the batch is sufficiently mixed, the barrel is stopped by means of the ordinary vehicle brakes, without stopping the engine, and the batch is removed. Because of its simplicity in construction and operation, this device is well adapted for small jobs, such as repair work and the like where it is not economical to set up a large mixer.

I claim:

1. In a mixer of the class described, a container, and a plurality of slotted brackets secured to the container at one end, the brackets being bent substantially at right angles and having slotted portions projecting beyond the end of the container but parallel thereto for attachment to tire rim connecting lugs of wheels of different sizes.

2. The combination with an automobile having a driving wheel with a demountable rim and means for securing the tire rim to the wheel, of a mixer barrel open at one end for engagement at the other end with the outer side of the wheel and having side fastening devices engaged by said rim securing means for holding the barrel with its open end projecting from the wheel.

3. The combination with an automobile having driving wheels and demountable tire casing rims therefor, of a mixing barrel having attaching brackets at one end, common means in connection with the wheels for engaging the brackets of the barrel and for engaging the rim for attaching the rim and the barrel to the wheel.

4. An automobile mixer device having means for attaching it to the wheel of an automobile, comprising a barrel rotatable about its longitudinal axis with flights therein at an angle to the axis of rotation, and slotted brackets attached to the outside of the barrel at one end, the slots being adapted for engagement with tire engaging lugs of automobile wheels of different sizes.

WALLACE C. MacGREGOR.